Aug. 28, 1956         V. O. BOWLES         2,760,915
METHOD AND APPARATUS FOR SPRAYING A HYDROCARBON FEED
   OIL IN A MOVING BED HYDROCARBON CONVERSION SYSTEM
Filed July 9, 1952                         3 Sheets-Sheet 1

INVENTOR.
Vernon O. Bowles
BY
Andrew L. Jabouriault
               AGENT

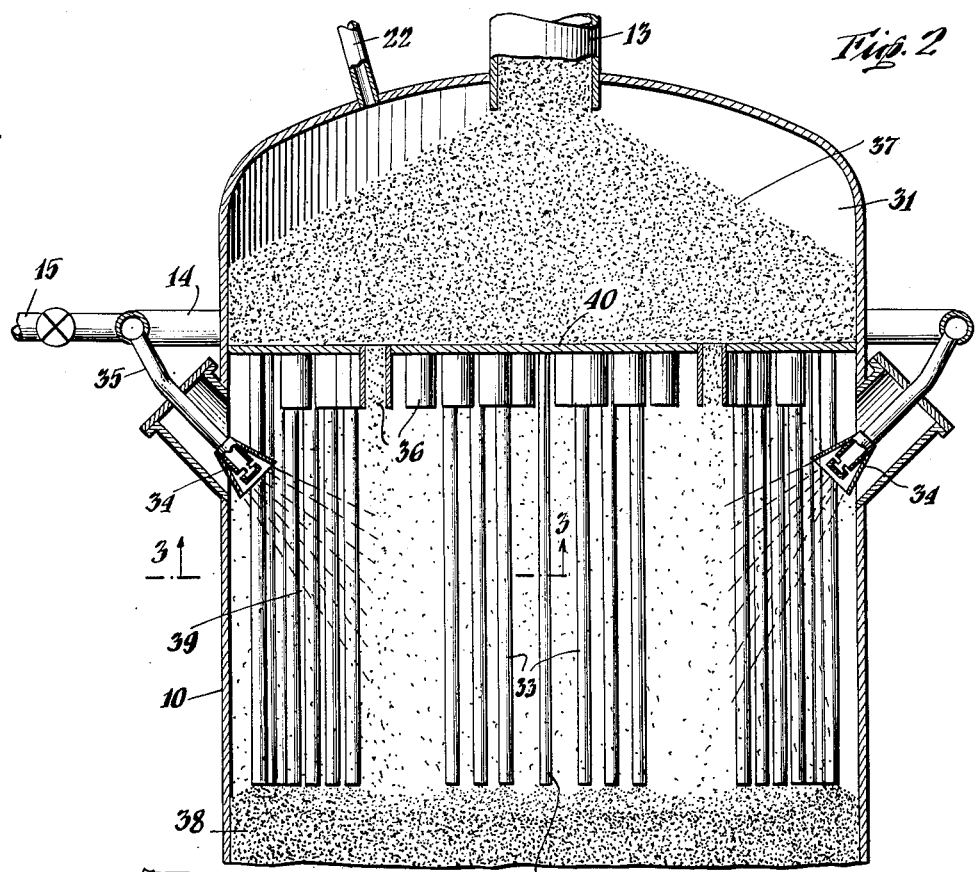
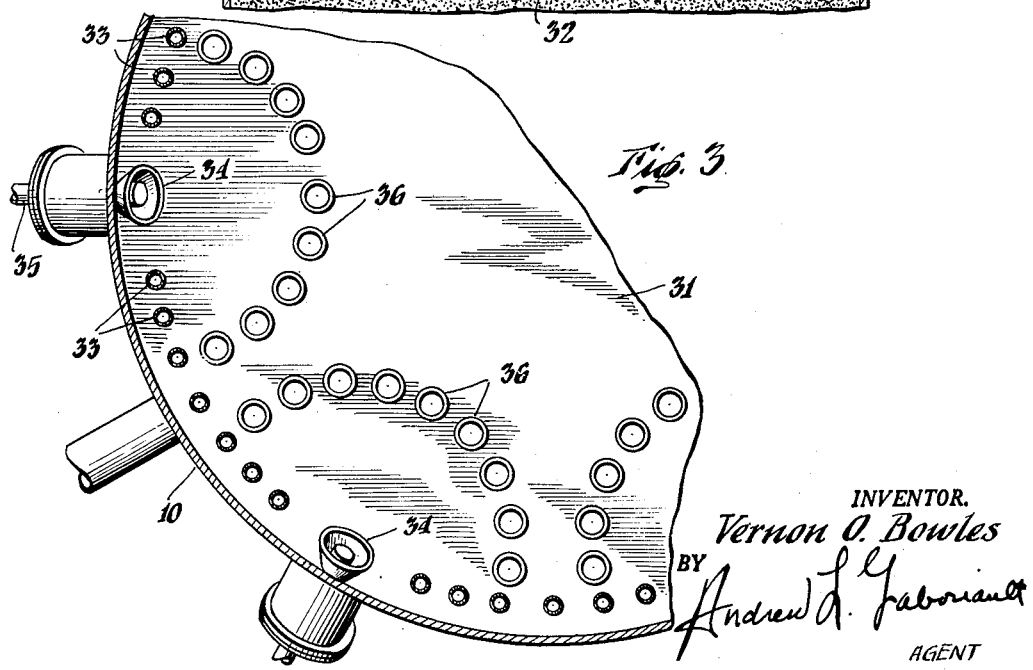

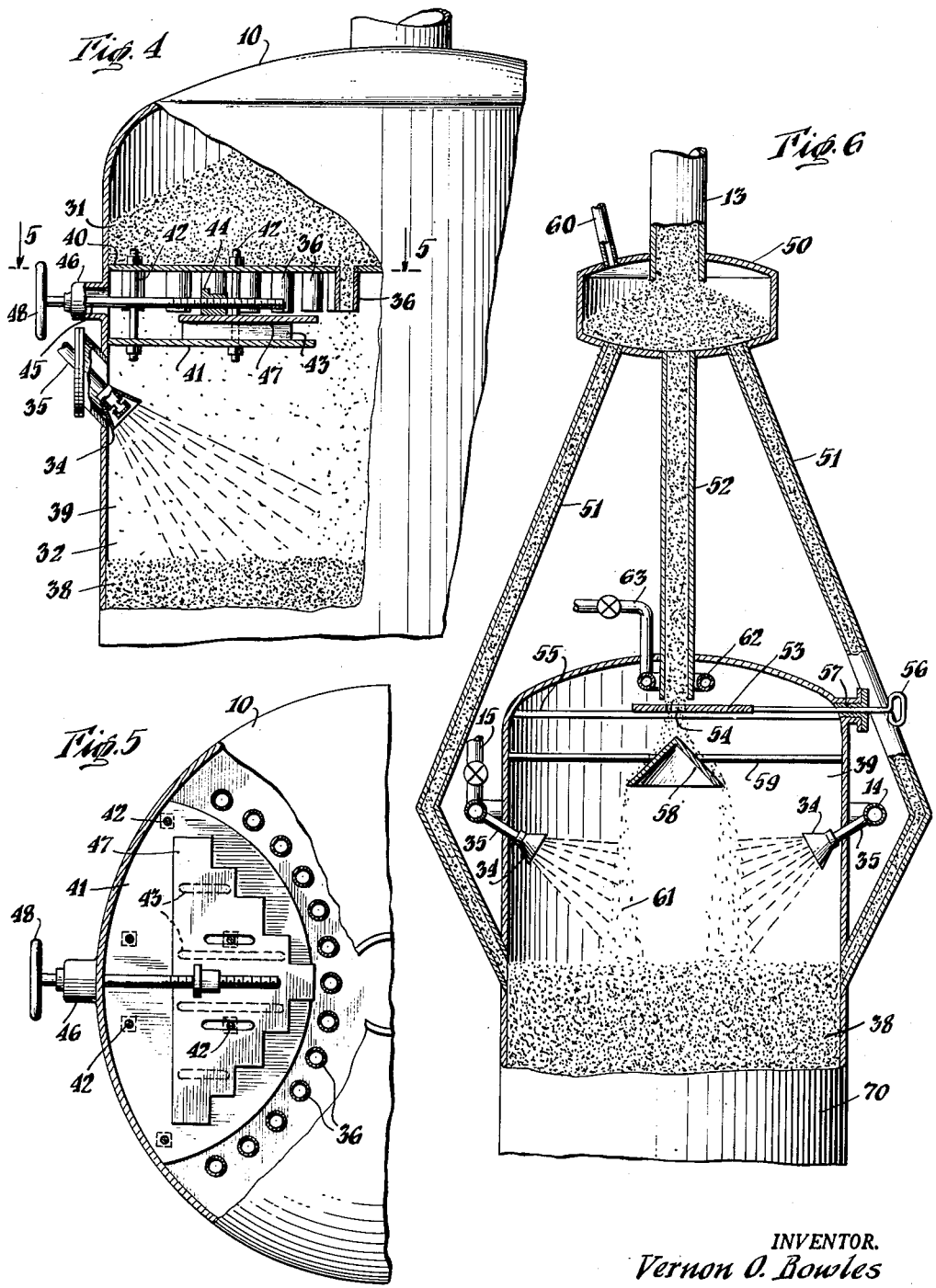

United States Patent Office 2,760,915
Patented Aug. 28, 1956

2,760,915

METHOD AND APPARATUS FOR SPRAYING A HYDROCARBON FEED OIL IN A MOVING BED HYDROCARBON CONVERSION SYSTEM

Vernon O. Bowles, Rye, N. Y., assignor to Socony Mobil Oil Company, Inc., a corporation of New York Application July 9, 1952, Serial No. 297,845

2 Claims. (Cl. 196—52)

This invention pertains to a method and apparatus for the conversion of high boiling liquid or mixed phase hydrocarbons to lower boiling hydrocarbons in the presence of a moving mass of granular contact material which may or may not exhibit catalytic properties with respect to the conversion reaction. Particularly, this invention applies to conversion processes wherein the contact material is passed cyclically through a conversion zone wherein it flows as a substantially compact columnar mass while being contacted with hydrocarbon charge to effect the conversion thereof, and through a regeneration or reconditioning zone wherein the contact material is conditioned for reuse in the conversion zone.

Typical of such processes is the catalytic conversion of heated liquid hydrocarbons to lower boiling, gasoline containing gaseous hydrocarbon products by contacting a high boiling liquid charge, at temperatures of 850° F. and upwards, with a granular, adsorbent, catalytic material. Other exemplary processes are the thermal visbreaking, coking or cracking of liquid or mixed phase hydrocarbon charge by contact with heated granular inert contact materials. In processes wherein the contact material is catalytic in nature, it may partake of the nature of natural or synthetic clays, bauxite, activated alumina and synthetic associations of silica, alumina or silica and alumina to which other substances, such as certain metallic oxides, may be added in small amounts for specific purposes. When the contact material is inert in character it may partake of the form of refractory materials, such as zirkite or cohart material or mullite, or it may partake of the form of stones or metallic particles or balls or particles of coke. It is desirable to maintain the size of the contact material particles within the range about 3 to 100 mesh and preferably within the range about 4 to 20 mesh by Tyler Standard Screen Analysis.

In charging liquid hydrocarbons to the conversion zone of processes of the aforementioned types, it is of prime importance that the liquid hydrocarbons be introduced in such a manner that there is uniform distribution of the liquid across the horizontal cross-section of the columnar mass of contact material within the conversion zone. Uneven distribution of the charge results in overconversion of a portion of the hydrocarbon charge and under-conversion of the remaining portion so that a low yield of products results. A further problem occurring in systems employing liquid hydrocarbon charge is the accumulation of coke deposits on metal surfaces of the conversion chamber. These coke deposits are due to the liquid charge contacting the hot metal surfaces and undergoing conversion thereon to deposit the coke. Coke deposits may build up on the metal surfaces and break off as large pieces which pass downwardly with the contact material and plug up restricted passages in the lower section of the conversion vessel or elsewhere in the system.

The prior art discloses various systems for overcoming these difficulties. Many of these systems involve spraying the liquid component of the charge or a mixed phase charge from a central point above the contact material column downwardly and outwardly toward the walls of the conversion chamber. Frequently a freely falling curtain of contact material surrounds the liquid spray. Occasionally in this type system the liquid charge forms a fog or suspended mist which penetrates the contact material curtain and contacts the wall of the conversion vessel shortly therebeyond to form the undesirable coke. Another difficulty with this type of system occurs when it is desired to supply a mixed feed through the spraying device. The vapor portion of the feed tends to expand laterally from the point of supply and carry with it atomized liquid to the walls of the vessel. This expansion is so rapid in some cases that it disrupts the contact material curtain which allows more liquid to reach the vessel walls.

A major object of this invention is to provide a method and apparatus for introducing a liquid or mixed phase charge to hydrocarbon conversion systems which overcomes the above described difficulties.

Another object of this invention is to provide a method and apparatus for the introduction of mixed phase hydrocarbon charge to a conversion chamber which avoids the formation of excessive amounts of coky deposits on the walls of the chamber.

Another object of this invention is to provide a method and apparatus for the conversion of a liquid hydrocarbon charge in the presence of a downwardly moving mass of granular contact material which provides for a uniform conversion of the charge while avoiding excessive coky deposits on the walls of the conversion chamber.

These and other objects of the invention will be apparent from the following discussion.

Before proceeding with the discussion certain terms used in describing and claiming this invention will be defined. The term "gaseous" as used herein is intended to refer to a material existing in the gaseous phase under the particular conditions of temperature and pressure involved, regardless of what may be the normal phase of that material under ordinary atmospheric conditions. Similarly, "liquid" refers to material in the liquid phase under the particular conditions prevailing regardless of its normal state. The term "liquid" when referred to hydrocarbon charge should not be understood to mean that the total charge to the system is supplied in the liquid phase but rather that some part is supplied as a liquid.

This invention provides a system for the introduction of liquid or mixed phase hydrocarbons to a conversion zone containing a downwardly gravitating, substantially compact bed of granular contact material. In this system a gas plenum space is provided in the upper section of the conversion zone or housing above the bed of contact material. Liquid is sprayed downwardly and radially inwardly toward the center of the plenum space from a plurality of spaced-apart points around the periphery of the plenum space at a level substantially above the upper surface of the contact material bed. At least a portion of the contact material to be supplied to the bed is passed downwardly through the plenum space as at least one freely falling shower of contact material which is situated closer to the center of the horizontal cross-section of the plenum space than the points of liquid spray. The liquid passes into the shower from the outside and at least a major portion is carried onto the surface of the column by the shower.

This invention will be best understood by referring to the attached drawings, of which Figure 1 is an elevational view showing a typical hydrocarbon conversion system to which this invention may be applied;

Figure 2 is an elevational view, partially in section, of the upper portion of a conversion vessel utilizing this invention;

Figure 3 is a sectional view along line 3—3 of Figure 2;

Figure 4 is an elevational view, partially in section, showing the application of a modified form of this invention to the upper section of a hydrocarbon conversion vessel;

Figure 5 is a sectional view along line 5—5 of Figure 4;

Figure 6 is an elevational view, partially in section, showing the application of another modified form of this invention to the upper section of a conversion vessel.

Figure 1:
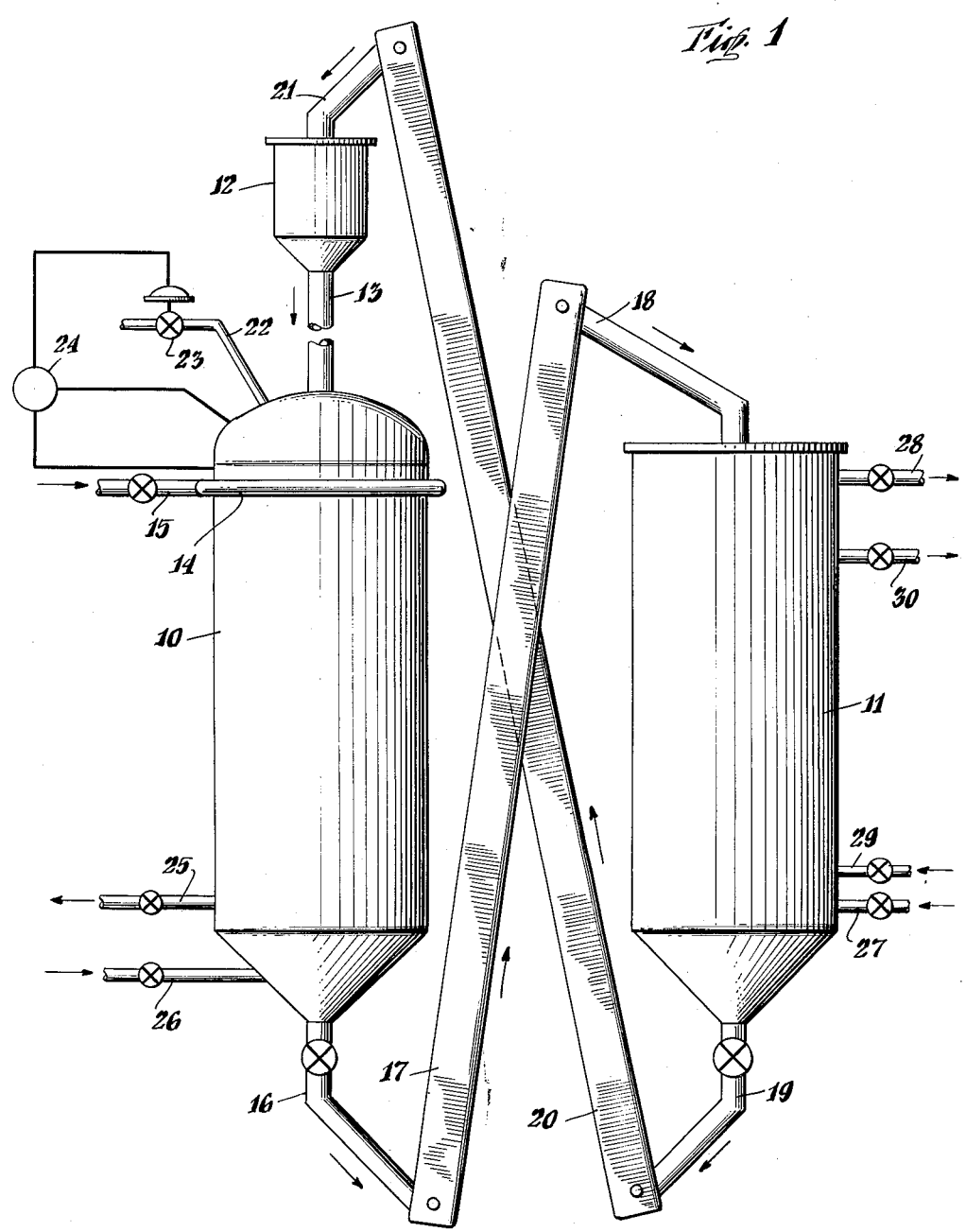

Turning to Figure 1, there is shown therein a conversion vessel 10 and reconditioning vessel 11 positioned side by side. Positioned above vessel 10 is a supply hopper 12 connecten by conduit or feed leg 13 to the upper end of vessel 10. A ring header 14 extends around vessel 10 equipped with a supply conduit 15. A contact material drain conduit 16 extends from the lower end of vessel 10 into the lower section of conveyor 17 which extends to a level above reconditioning vessel 11. Conduit 18 connects the upper section of conveyor 17 with the upper end of vessel 11. Drain conduit 19 extends from the bottom of vessel 11 into the lower section of a second conveyor 20 which extends to a level above supply hopper 12. Conveyors 17 and 20 may take any of the forms suitable for the transfer of hot contact material, such as a bucket elevator or gas lift. Conduit 21 connects the upper section of conveyor 20 with the upper end of hopper 12.

In operation, fresh granular contact material, at a temperature suitable for the desired conversion, gravitates from hopper 12 through seal leg 13 into the upper section of vessel 10. In the upper end of vessel 10 is provided a seal zone with a conversion zone therebelow as is described hereinbelow. Inert seal gas, such as steam or flue gas, is maintained in the seal zone at a pressure slightly in excess of the gaseous pressure in the conversion zone therebelow by admitting seal gas through conduit 22 at a rate controlled by diaphragm valve 23 in response to differential pressure controller 24. A liquid or mixed phase hydrocarbon charge is supplied to header 14 through passage 15 and admitted to the conversion zone of vessel 10 in a manner described hereinbelow. Contact material gravitates through vessel 10 as a substantially compact column and the hydrocarbon charge passes through this column to effect the desired conversion. Gaseous products of conversion are withdrawn from the conversion zone through passage 25. The gaseous products may be disengaged from the contact material column in vessel 10 by any of a number of suitable arrangements, such as those shown in Simpson et al., U. S. Patent No. 2,336,041 or Fahnestock, U. S. Patent No. 2,362,621. Spent contact material is freed of any adhering hydrocarbons by purging with an inert purge gas, such as steam or flue gas, admitted through conduit 26 and then removed from vessel 10 through passage 16 and passed into the upper section of reconditioner 11 by means of conveyor 17 and conduit 18. The particular reconditioner shown in Figure 1 is in the form of a catalyst regenerator adapted to burn off the carbonaceous contaminant deposited on the contact material when the conversion reaction is catalytic in nature. The granular catalyst gravitates through regenerator 11 as a substantially compact column. A combustion supporting gas, such as air, is admitted through passage 27 and passed upwardly through the column to effect the burning. Flue gas produced thereby is removed through passage 28. Cooling coils (not shown) are provided within vessel 11 to prevent overheating of the catalyst to a level where it would be permanently damaged. A suitable cooling fluid is supplied to these coils through passage 29 and removed therefrom through passage 30. The reconditioner will, of course, take many other different forms depending on the particular reaction and contact material involved. For example, where the contact material is substantially inert in character, the reconditioner may take the form of an apparatus, the sole function of which is to heat the contact material. The reconditioned contact material is removed from the lower section of vessel 11 through conduit 19 and returned to supply hopper 12 by means of conveyor 20 and conduit 21.

The details of the application of this invention to the upper section of the reaction vessel 10 are shown in Figures 2 and 3, which will be considered together.

Shown therein is a partition 40 extending transversely across the upper section of conversion vessel 10 so as to divide it into a seal chamber in the upper section of the vessel above 31 and a conversion chamber 32 therebelow. Supply condut 13 extends into the upper section of seal chamber 31. A plurality of spaced-apart conduits 33 extend through partition 31 downwardly to a common level substantially below the partition within conversion chamber 32. Conduits 33 are spaced apart around the periphery of the conversion chamber. A plurality of liquid spray devices 34 in the form of impingement type nozzles are positioned around the periphery of chamber 32 at a level substantially above the lower ends of conduits 33. Nozzles 34 are positioned so as to direct a liquid spray downwardly and radially inwardly toward the center of a horizontal cross-section of conversion chamber 32. The lines along which the spray from nozzles 34 are directed should cross the level of the lower ends of conduits 33 before reaching the opposite walls of conversion chamber 32. A plurality of conduits 35 connect nozzles 34 to ring header 14. A suitable nozzle for this system should not spray liquid upwardly or backwardly where it might contact the hot metal parts above or in back of the nozzle. The nozzle shown in Figures 2 through 5, which is suitable for this invention, is described and claimed in U. S. patent application Serial No. 257,271, filed November 20, 1951. It consists of a central body with a continuous slot around its lower section through which the liquid or mixed phase charge may be forced. The charge then impinges on a conical skirt around the lower section of the body so that it is deflected downwardly and outwardly as a conical spray. Extending through partition 31 into the upper section of conversion chamber 36 to a level substantially above spray devices 34 are a plurality of conduits 36. Conduits 36 are arranged in a plurality of circular arcs with open concave sides against the walls of chamber 32. This is most easily seen in Figure 3. The projection of one of the circular arcs formed by passageways 36 is around each of spray devices 34.

In operation, fresh granular contact material, at a temperature suitable for the desired conversion reaction, is supplied to an accumulation 37 of contact material within seal zone 31. Seal gas is admitted to zone 31 through passage 22 as described in connection with Figure 1. Contact material gravitates from accumulation 37 through passages 33 as a plurality of substantially compact streams onto the upper surface of a substantially compact column or bed of contact material 38 in the lower section of conversion zone or housing 32. The streams flowing in 33 act to maintain the upper surface of column 38 at a level substantially below the upper end of zone 32 so as to define a plenum space 39 above the column in the upper section of zone 32, since the discharge from passages 33 is throttled only by the surface of column 38. Contact material also gravitates from accumulation 37 downwardly through passages 36 into the upper section of plenum space 39. Contact material from passages 36 drops through the plenum space as a plurality of freely falling curtains in the shape of circular arcs. These curtains are spaced around the periphery of the plenum space 39, so that a portion of the plenum space is enclosed between each curtain and the walls of the plenum space. Liquid or mixed phase hydrocarbon charge is supplied to ring header 14 through passage 15 and passed from the header to liquid spray devices 34 through passages 35. The charge is sprayed downwardly and radially toward the center of plenum space 39 by spray devices 34 along lines which intersect the upper surface of column 38 before reaching the opposite wall of vessel 10, so that each spray will terminate short of the opposite wall of the vessel. Each spray from each of the devices shown in Figure 2 will take the form of a cone with a downwardly sloping axis which terminates short of the opposite wall of the plenum space. Each spray is located centrally within one of the curtains of falling contact material so that most of the liquid will be sorbed on the falling contact material in the curtains and will be distributed uniformly thereon. The process then continues as described in connection with Figure 1.

Figures 4 and 5 illustrate a modified form of this invention and will be considered together. Shown therein is transverse partition 40 forming seal chamber 31 thereabove and conversion chamber 32 therebelow within conversion vessel 10. A plurality of liquid spray nozzles 34 extend into the conversion chamber 32 at a plurality of points around the periphery of the chamber 32. A plurality of conduits 36 depend from partition 40 so as to form a plurality of passageways in the shape of circular arcs, the projection of one such passageway being around each of spray devices 34. Positioned at a level a spaced distance below the lower ends of passageway 36 are a plurality of transverse support plates 41. One of plates 41 extends horizontally outwardly from the walls of chamber 32 within the portion of the conversion chamber 32 enclosed by the projection of each of the circular arcs formed by passageways 36. Each of plates 41 is of a size and configuration such that it terminates short of the projection of passageways 36. Plates 41 are supported from partition 40 by bolts 42. Sliding bars 43 are attached to each of plates 42 and a substantially horizontal closing plate 47 rests on bars 43. Closing plate 47 lies in a substantially horizontal plane at a level directly below the lower ends of conduits 36. The lateral dimensions of closing plate 47 are such that they can be moved to a position within the circular arc described by the projection of conduits 36. The front end of 47 has the shape of two sets of converging steps, the high point being at the center of the front end of 47. The steps are of sufficient depth that when plate 47 is moved one of conduits 36 in the center of the circular arc formed thereby is first closed off without closing off the remainder of conduits 36. Then as the plate 47 is moved further forward successive pairs of conduits 36 are closed off, one on each side of the central conduit. A nut 44 is attached to the upper surface of 47 and lies in a horizontal plane. A valve stem 45 with a threaded outer end is screwed into nut 44 and extends to the exterior of vessel 10 through a valve bonnet 46. A handle 48 is attached to the outer end of stem 45 so that plate 47 may be positioned as desired from the exterior of vessel 10.

The operation of the apparatus of Figures 4 and 5 is similar to that of Figures 3 and 4, except that the surface level of contact material column 38 is controlled below the level of spray nozzles 34 to define plenum space 39 by controlling the number of conduits 36 through which contact material flows, rather than using the peripheral pipes 33. To accomplish this, plates 47 are moved forward or backward to open or close the required number of conduits 36 to maintain the surface of column 38 at the desired level. A suitable column level measuring device, such as that shown in Hagerbaumer, U. S. Patent No. 2,458,162 or Simpson, U. S. Patent No. 2,574,503, may be used to control the operation of plate 47.

Another form of this invention is illustrated in Figure 6. Shown therein is a conversion vessel or chamber 70 with a separate seal chamber positioned thereabove. A plurality of conduits 51 extend from chamber 50 into chamber 70 at the level at which it is desired to maintain the upper surface of compact column of contact material 38. Conduits 51 terminate adjacent the inner periphery of chamber 10. A central conduit 52 extends from the lower section of seal chamber 50 into the upper end of conversion chamber 70 and terminates therein at a level substantially above the level at which conduits 51 terminate. Immediately below conduit 52 is slide valve plate 53 having an opening 54 therethrough through which contact material may pass. Plate 53 rests on angle members 55 and a rod 56 extends from one end of plate 53 to the exterior of chamber 70 through a stuffing box 57. By means of rod 56 plate 53 may be moved back and forth laterally to open and close the flow through conduit 52. An upright conical baffle 58 is positioned below slide plate 53 by support rods 59 with the apex of baffle 58 on the center line of conduit 52. A plurality of liquid spray devices 34 are positioned around the periphery of chamber 70 at a level substantially above the level of the lower ends of conduits 51 and are adapted to direct a spray of liquid or mixed phase hydrocarbons downwardly and radially inwardly toward the center of the horizontal cross-section of chamber 70. Spray devices 34 are connected to conduits 35 which extend into chamber 70 from ring header 14.

In operation, fresh contact material, at a temperature suitable for the desired conversion, gravitates into seal chamber 50 through passage 13. Seal gas is supplied to chamber 50 through passage 60. Contact material gravitates from chamber 50 as a plurality of substantially compact streams through passages 51 into conversion zone or housing 70 at a level substantially below the upper end of housing 70. These streams act to maintain a compact column of contact material 38 in the lower section of conversion zone 70 with upper surface at the level of the lower ends of conduits 51 so that a gas plenum space 39 is formed in the upper section of zone 70. It will be noted that conduits 51 do not pass through plenum space 39 but only enter vessel 70 at the level at which it is desired to maintain the surface of column 38. By this construction any chance of liquid charge contacting these conduits to form coke thereon is eliminated. Contact material also gravitates through conduit 52 when slide valve 53 is in the open position and drops onto baffle 58. The lower end of baffle 58 is of substantially less horizontal cross-sectional area than plenum space 39. Contact material passes downwardly over the baffle and drops from its lower edge and falls freely as a tubular shower or curtain 61 of contact material particles onto the upper surface of column 38. This shower is of substantially less horizontal cross-sectional area than plenum space 39. Liquid or mixed phase hydrocarbon charge is sprayed downwardly and radially inwardly into shower 61 from a plurality of points outside the shower and around the periphery of space 29 at a level substantially above column 38 by means of spray devices 34. The process then proceeds as described in connection with Figure 1. If desired, a steam blanket may be maintained around the lower end of conduit 52 and slide valve 53 to insure that liquid hydrocarbons will not contact these parts. This is accomplished by supplying steam to a coil 62 by means of conduit 63 and spraying the steam downwardly through orifices in the under side of the coil.

It is apparent that this invention minimizes many of the difficulties found in prior art systems. Since the liquid or mixed phase charge is supplied at a plurality of points around the periphery of plenum space 39 and a spray of the charge is directed downwardly and inwardly from these points, the maximum distance between the point of spray and the metal walls of the conversion vessel is provided. This distance will be about twice that of systems employing a central spray. Thus, the possibility of liquid charge contacting the vessel walls is materially reduced. This invention also shows an advantage where a mixed liquid vapor feed is supplied through nozzles 34, in that the possibility of the vapor portion of the feed carrying entrained liquid to the walls of the vessel is materially reduced.

The various parts of the improved apparatus of this invention may take other forms than those shown and described herein. For example, the liquid spray device 35 need not be of the particular type shown but may be of any of a wide variety of types well known in the prior art. The spray device should not, however, be one which sprays any appreciable amount of liquid upwardly where it may contact partition 40 or plate 41 or backwardly where it will contact the walls of vessel 10 or 70 or pipes 33. The curtain forming device of Figures 2 through 5 need not consist of a plurality of conduits 36 but may be a continuous slot in partition 40. The curtain forming device need not be in the form of a circular arc but may consist of a segment or a rectangle or other figure with open side against the walls of the conversion chamber. The curtain forming device and curtain formed thereby may broadly be in the form of a segment of any annular-shaped passageway where an annular-shaped passageway is defined as the passageway formed between two members of the same or different cross-sectional shapes placed one within the other, regardless of whether the passage is ring-shaped or not. When the form of the invention shown in Figure 6 is used, the central shower or curtain 61 need not be circular in shape but may be of any other desired shape, such as rectangular, hexagonal, etc. Other means well known in the art may be used to control the flow from passage 52 and in some cases baffle 58 may be eliminated and the shower formed merely by free fall directly from passage 52. While this invention makes the supply of mixed phase charge through spray device 34 particularly advantageous, vapor charge, if desired, may be supplied to the conversion chamber separately of the liquid charge. When pipes 33 are used to control the surface of the contact material column, they should be placed so as not to be within the range of the liquid spray from nozzles 34. Generally, these pipes should be around the periphery of the conversion chamber either within the curtains behind nozzles 34 or between the curtains.

Operating conditions vary widely in the process of this invention, depending upon the particular application. Generally, contact material should be supplied to the conversion zone at temperatures within the range about 900° F.–1200° F., but in some applications such as the thermal conversion of hydrocarbon charge, the contact material introduced may be at a temperature as high as 1700° F. The liquid or mixed phase charge should generally be supplied at temperatures within the range about 500° F.–800° F., although temperatures outside this range may be used in some applications. The ratio of contact material to hydrocarbon charge supplied to the conversion chamber should be within the range about 0.5 to 20 parts of contact material per part of charge by weight, and the space velocity of the hydrocarbon charge should generally be within the range about 1 to 10 volumes of charge per volume of contact material bed per hour based on the volume of the charge measured as a liquid at 60° F. When pipes 33 or 51 are used, they should carry from 10 to 50 per cent and preferable 10 to 30 per cent of the total contact material flow, the remainder being passed downwardly in the curtain or curtains.

In a suitable design of a catalytic conversion system according to this invention, the conversion chamber was 16 feet in diameter and 6 spray points and curtains in the form of circular arcs were spaced at 60 degree intervals around the periphery of the chamber. The spray nozzles were inclined at angles of 30 degrees with the horizontal and positioned 8 inches from the walls of the chamber. Each curtain was formed by 25 two-inch pipes on 5 inch centers arranged in the pattern of a circular arc with a 2 foot, 6 inch radius about a point 8 inches in front of the spray device. The plenum space above the contact material column was 5 feet high and the spray device was positioned 3.5 feet above the upper surface of the column.

This invention should be understood to cover all changes and modifications of the examples of the invention herein chosen for purposes of disclosure which do not constitute departures from the spirit and scope of the invention.

I claim:

1. A continuous process for the conversion of high boiling fluid hydrocarbons to lower boiling gaseous products in the presence of a downwardly gravitating, substantially compact column of granular contact material which comprises: maintaining said column within the lower section of a confined conversion zone, maintaining a gas plenum space above said column in the upper section of the conversion zone, passing contact material at a temperature suitable for the desired conversion downwardly through said plenum space onto the upper surface of said column as a plurality of freely falling curtains in the shape of circular arcs, said curtain being spaced uniformly around the periphery of said plenum space so that a portion of said plenum space is enclosed between each of said curtains and the confining walls of the plenum space, spraying hydrocarbon charge, at least partially in the liquid phase, into each of said curtains from a point within each curtain at a level substantially above the upper surface of said column, each of said sprays of hydrocarbon charge being in the form of a downwardly sloping cone directed radially toward the center of said plenum space along a line which terminates short of the opposite confining wall of said plenum space, whereby said charge will pass onto the upper surface of said column with said contact material, controlling the surface level of said columns substantially below the level of the points of hydrocarbon spray by controlling the amount of contact material which is supplied to said curtains, passing the hydrocarbon charge downwardly through said column to effect the desired conversion to gaseous products, removing the gaseous products from the lower section of the conversion zone and removing contact material from the lower section of the column.

2. An apparatus for the continuous conversion of fluid hydrocarbons in the presence of a downwardly gravitating, substantially compact column of granular contact material which comprises in combination: an enclosed upright conversion chamber adapted to confine said column in its lower section, a plurality of horizontally and uniformly spaced-apart spray devices positioned around the inner periphery of the upper section of said chamber and adapted to spray hydrocarbon charge downwardly and radially inwardly toward the center of a horizontal cross-section of said chamber, a plurality of contact material supply conduits extending into the upper end of said chamber and terminating at a level above said spray devices, said conduits being arranged in the pattern of a plurality of circular arcs with centers on vertical lines with said spray devices, whereby contact material may drop from said conduits to form a plurality of curtains of freely falling particles, one such curtain being around each of said spray devices, a plurality of substantially horizontal laterally movable closing plates, one such plate positioned immediately below the lower ends of the conduits forming each arc and within the area enclosed by the downward projection of said conduits in each arc and the walls of said chamber, the forward end of said plates being so formed that as the plates are moved forward, the flow, through a successively greater number of said conduits, is closed off, means for moving said plate back and forth to close control of the flow of contact material through said conduits to maintain the upper surface of said column at a level substantially below said spray devices, means for removing products of conversion from the lower section of said chamber, and means for removing contact material from the lower section of said chamber.

References Cited in the file of this patent

UNITED STATES PATENTS

| | | |
|---|---|---|
| 2,394,651 | Alther | Feb. 12, 1946 |
| 2,548,912 | Savage | Apr. 17, 1951 |
| 2,574,850 | Utterback et al. | Nov. 13, 1951 |
| 2,666,734 | Findlay | Jan. 19, 1954 |